United States Patent
Shen et al.

(10) Patent No.: US 6,741,292 B1
(45) Date of Patent: May 25, 2004

(54) SYSTEM AND METHOD FOR A BASEBAND DIGITAL TELEVISION

(75) Inventors: Richard C. Shen, Leonia, NJ (US); Sheau B. Ng, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 367 days.

(21) Appl. No.: 09/706,670

(22) Filed: Nov. 6, 2000

(51) Int. Cl.[7] .............................. H04N 5/46; H04N 5/44
(52) U.S. Cl. ........................ 348/553; 348/554; 348/555; 348/725; 348/729
(58) Field of Search ................................ 348/553, 554, 348/555, 725, 729, 462, 568, 721, 569, 720, 723, 706; 725/131, 151, 100; 386/108, 109, 34, 27, 33

(56) References Cited

U.S. PATENT DOCUMENTS

| | | | |
|---|---|---|---|
| 5,684,804 A | * 11/1997 | Baronetti et al. | 370/509 |
| 5,825,242 A | 10/1998 | Prodan et al. | 329/304 |
| 5,899,578 A | * 5/1999 | Yanagihara et al. | 386/75 |
| 5,973,748 A | * 10/1999 | Horiguchi et al. | 348/554 |
| 5,986,716 A | * 11/1999 | Sokawa et al. | 348/553 |
| 6,034,732 A | 3/2000 | Hirota et al. | 348/441 |
| 6,091,458 A | * 7/2000 | Jeon et al. | 348/554 |
| 6,137,546 A | * 10/2000 | Shintani et al. | 348/731 |
| 6,285,408 B1 | * 9/2001 | Choi et al. | 348/555 |
| 6,305,021 B1 | * 10/2001 | Kim | 725/131 |
| 6,369,861 B1 | * 4/2002 | Lownes | 348/731 |
| 6,380,984 B1 | * 4/2002 | Inoue et al. | 348/569 |
| 6,483,553 B1 | * 11/2002 | Jung | 348/731 |
| 6,490,001 B1 | * 12/2002 | Shintani et al. | 348/554 |
| 6,501,510 B1 | * 12/2002 | Moon | 348/553 |
| 6,525,775 B1 | * 2/2003 | Kahn et al. | 348/460 |

FOREIGN PATENT DOCUMENTS

| | | |
|---|---|---|
| EP | 0766462 A2 | 4/1997 |
| EP | 0833514 A2 | 4/1998 |
| EP | 0840512 A2 | 5/1998 |
| EP | 0917356 A1 | 5/1999 |
| EP | 0993183 A2 | 4/2000 |

* cited by examiner

Primary Examiner—Michael H. Lee
Assistant Examiner—Jean W. Désir
(74) Attorney, Agent, or Firm—Laurie Gathman

(57) ABSTRACT

For use in a digital television receiver, there is disclosed a system for receiving audio and video digital signals. The system comprises a digital network interface coupled to a digital main board for receiving baseband audio and video digital signals and a digital video decoder coupled to the digital network interface for decoding audio and video digital signals from the digital network interface. The digital video decoder sends the decoded signals to the digital main board. The system also comprises an analog television chassis having an input that is capable of receiving audio and video analog signals. The digital main board digitizes the analog signals into a digital transport stream prior to processing.

19 Claims, 4 Drawing Sheets

SYSTEM AND METHOD FOR A BASEBAND DIGITAL TELEVISION

TECHNICAL FIELD OF THE INVENTION

The present invention is directed, in general, to television broadcast systems and, more specifically, to a system and method for receiving digital and analog television broadcasts.

BACKGROUND OF THE INVENTION

When television was first introduced, radio frequency (RF) analog terrestrial television broadcast was the only method of sending and receiving television broadcasts. Existing television sets have an RF Network Interface Module (NIM) for receiving an analog signal in addition to baseband signal processing circuitry. Over the years, this basic architecture has remained unchanged. However, with the relatively new introduction of digital television broadcasts, various television broadcast services have become more effective over terrestrial, cable and switched network channels.

Conventional digital television (DTV) broadcast receivers utilize, in part, an analog tuner for conventional analog television broadcast reception. A digital tuner and Vestigial Side Band (VSB) modulator are key components, in digital television, for receiving and demodulating broadcast digital signals. However, VSB is considered to be an emerging/developing technology and there are proposals to change or improve the Advanced Television Systems Committee (ATSC) standard to use a different transmission technology. Digital television (DTV) includes components for analog reception because, currently, the majority of all television broadcasts are analog broadcasts. However, the Federal Communication Commission (FCC) has issued directives that require broadcasting affiliates of the major networks to complete the transition to DTV between the years 2003 and 2006.

Currently many digital cable service providers and consumers rely on set top boxes (STBs) to convert digital video broadcast signals for analog television sets. In addition to network or cable broadcast signals, digital video signals may also be received from a Compact Disk Read Only Memory (CD-ROM) player, or from a Digital Video Disk (DVD) player. A STB may receive and process both a digital and an analog video signal. If the received signal is digital, the STB demodulates the signal and passes the converted signal to the television receiver via an IEEE-1394 bus (i.e., a bus using the IEEE standard 1394-1995). If the received broadcast signal is analog, the signal is passed directly to the analog television receiver.

In low-end set top boxes, analog signals are the only signals that may be passed to the analog television receiver. In high-end set top boxes, digital signals are processed by the set top box (STB) and analog signals may be passed to the receiver via the progressive scan (2fH) analog component video connectors. Additionally, digital signals may be transmitted over cable television through the STB utilizing Moving Pictures Experts Group (MPEG) format and graphic overlays. A digital video signal may also be transmitted through the STB via an IEEE-1394 bus from a digital camcorder (a combination camera and video recorder), digital Video Cassette Recorder (D-VCR), Digital Video Disk (DVD), and other similar types of equipment.

Current TV/DTV architecture requires RF input and channel decoding functions in the DTV "front end" (e.g., VSB modulation and Quadrature Amplitude Modulation (QAM)) in order to receive and display audio/video (A/V) programs. Additionally, as new broadcast services are added, additional RF inputs are usually required, which adds to the cost of a television receiver.

There is therefore a need in the art for eliminating RF inputs in a television receiver. There is a need in the art to retain the capability of receiving analog signals. There is also a need in the art to accommodate new broadcast services without adding RF inputs. Further, there is also a need in the art to reduce the cost of digital television receivers.

SUMMARY OF THE INVENTION

To address the above-discussed deficiencies of the prior art, it is a primary object of the present invention to provide, for use in a digital television receiver, a system for receiving analog and digital video signals without RF inputs.

It is a further object of the present invention to provide a system that will process and display analog broadcast television audio/video signals.

It is another object of the present invention to provide a system that will process and display broadcast digital television signals and digital outputs from digital audio/video units such as digital VCRs, digital video camcorders, digital outputs from set top boxes and similar types of equipment.

It is also an object of the present invention to provide a system comprising a baseband digital television that is capable of operating as a universal multi-standard digital television.

It is another object of the present invention to provide a system comprising a baseband digital television that is capable of supporting both the ATSC standard and the DVB standard with respect to an MPEG transport stream input.

It is also an object of the present invention to provide a system comprising a baseband digital television that will minimize the likelihood of obsolescence.

The system comprises a digital network interface coupled to a digital main board for receiving baseband audio and video digital signals and a digital video decoder coupled to the digital network interface for decoding audio and video digital signals from the digital network interface. The digital video decoder sends the decoded signals to the digital main board. The system also comprises an analog television chassis having an input that is capable of receiving audio and video analog signals. The digital main board digitizes the analog signals into a digital transport stream prior to processing.

According to an advantageous embodiment of the present invention, the digital network interface comprises an input capable of receiving audio and video digital signals from a digital signal playback device.

According to another advantageous embodiment of the present invention, a graphics overlay signal generator coupled to the digital main board is capable of adding at least one digital video signal to digital video signals within the digital main board.

According to yet another advantageous embodiment of the present invention, the analog television chassis comprises an input capable of receiving audio and video analog signals.

According to still another advantageous embodiment of the present invention, the digital network interface comprises an IEEE 1394 bus.

According to an additional advantageous embodiment of the present invention, the analog television chassis is capable of receiving audio and video analog signals having a 2fH format.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention. In this patent document are by way of illustration only and should not be construed in any way to limit the scope of the invention. Those skilled in the art will understand that the principles of the present invention may be implemented in any suitably arranged digital television.

Figure 1:
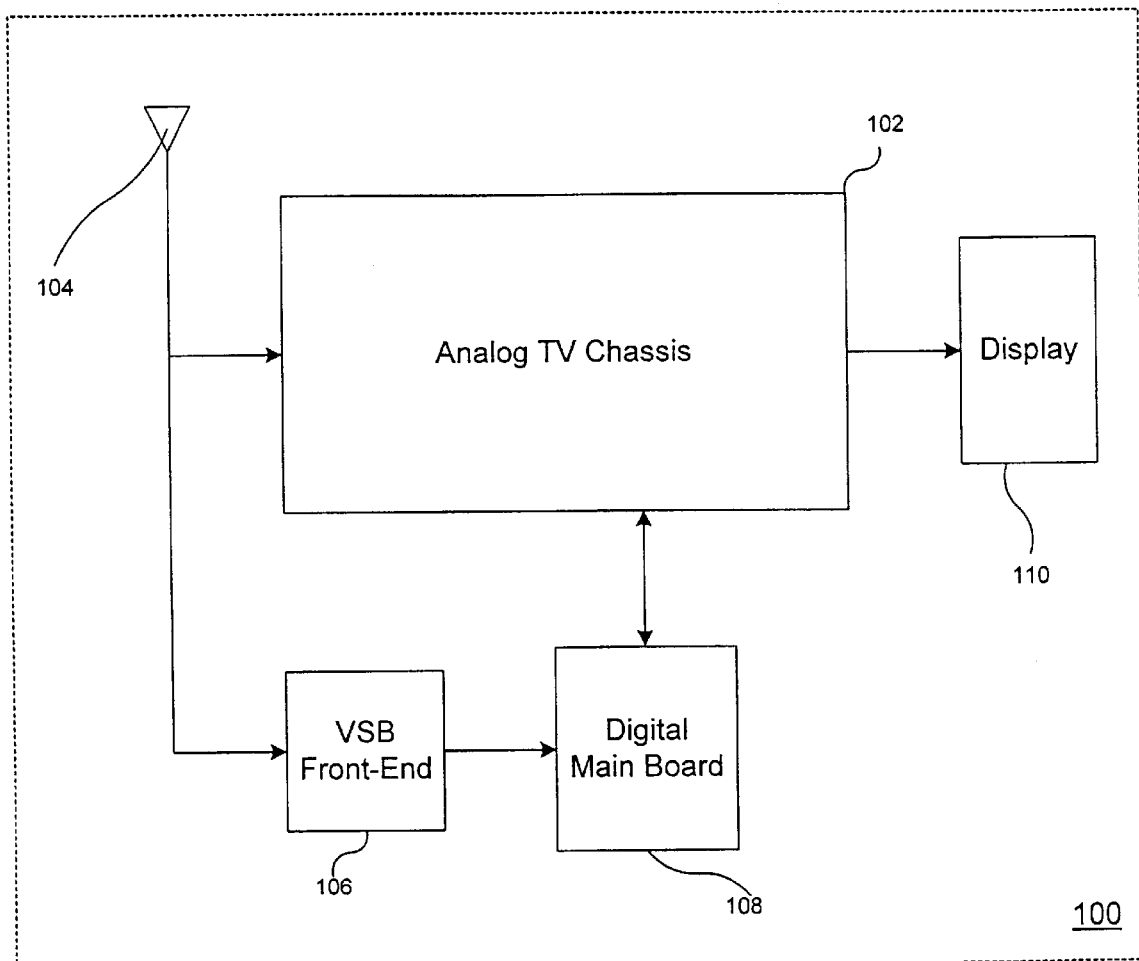
FIG. 1 illustrates a high-level block diagram of a conventional digital television receiver that is capable of receiving analog signals.

FIG. 1 illustrates a high-level block diagram of a conventional digital television receiver that is capable of receiving analog and digital signals. Digital television receiver (DTV) 100 includes analog TV chassis 102, antenna 104 for receiving broadcast signals, vestigial side band (VSB) front-end 106, digital main board 108 and display 110. Analog TV chassis 102 includes a tuner, an intermediate frequency (IF) amplifier, a detector and a video amplifier (all not shown).

Conventional digital broadcast receivers utilize, in part, an analog tuner (not shown) for receiving conventional television broadcast signals through antenna 104. DTV signals may be transmitted via VSB amplitude modulation by terrestrial broadcasting stations and may also be received by antenna 104. Currently, in order for DTV 100 to receive a digital audio/video signal, VSB front-end 106 is required. VSB front-end 106, a requirement for digital television by the Advanced Television Systems Committee (ATSC), receives a DTV broadcast signal via antenna 104, that has been converted into an analog signal for transmission. VSB 106 digitizes the analog signal and sends the digitized signal to be processed by digital main board 108. Digital main board 108 decodes both audio and video portions of the received DTV signal.

Both analog and digital signals are processed by digital main board 108. Analog TV chassis 102 receives the decoded digital signals from digital main board 108 and drives display 110 which may be a television screen, a projector screen, a CRT device or any similar type of equipment.

Figure 2:
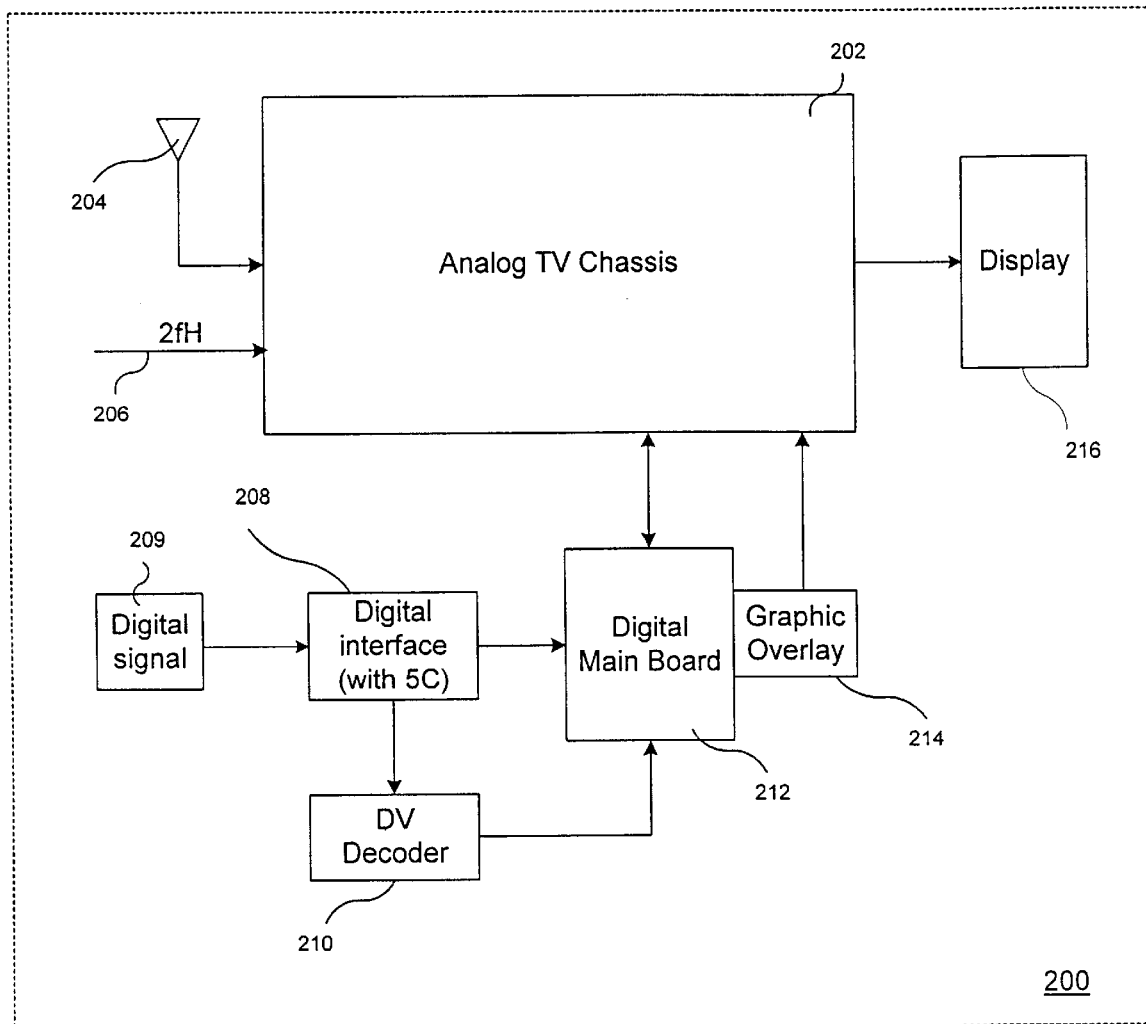
FIG. 2 illustrates a high-level block diagram of an exemplary digital television receiver according to an advantageous embodiment of the present invention.

FIG. 2 illustrates a high-level block diagram of exemplary digital television receiver 200 according to one embodiment of the present invention. Digital television receiver 200 supports legacy service such as National Television Standards Committee (NTSC) broadcast standard (525 lines at 60 fields per second). Digital television receiver 200 also supports projected future digital multimedia services. While conventional DTV 100 requires a RF network interface module (NIM) (not shown) to receive and process analog television signals, digital television receiver 200 of the present invention does not require a RF NIM. Signal 2fH 206 may be a VGA or digital video disk type of display signal which may be sent directly to display 216 without need for digital processing. A digital network interface 208, such as a high performance serial bus that conforms to the IEEE-1394-1995 standard, is utilized to receive baseband digital signals 209. Baseband signals 209, received from cable television, satellite and other broadcast media, are passed directly to digital main board 212 for processing. Digital network interface 208 serves as the input front-end instead of RF NIM. The incoming baseband signals may be uncompressed or compressed. In addition, cryptographic protocols such as Digital Transmission Content Protection Specification (also known as "5C") may be used in connection with IEEE 1394 digital network interface 208. Cryptographic protocols are used to protect audio/video content from unauthorized copying.

A compressed digital input stream may be transported by digital network interface 208 in accordance with ATSC or Digital Video Broadcast Group (DVB) standards. Compressed digital signal input may be Motion Pictures Experts Group (MPEG) streaming video or Digital Video (DV) or any other compressed digital signal input. DV decoder 210 may comprise an MPEG decoder for compressed bit streams, a digital video decoder for input from a DV camcorder, or other similar device. DV decoder 210 receives and processes a compressed digital input signal. DV decoder 210 then sends the processed signal to digital main board 212. Similarly, DV decoder 210 may process a digital input from a digital video camcorder or any other device having a compressed, digital audio/video output.

IEEE-1394 digital network interface 208 is basically a conduit for digital bits, compressed and uncompressed. IEEE-1394 digital network interface 208 permits the use of many current applications, such as Joint Photographic Experts Group (JPEG) applications, or motion JPEG (MJPEG) applications, or "wavelets" (high ratio image compression), or DV camcorder, and other future additional applications. If a new A/V method of transporting A/V signals via IEEE-1394 digital network interface 108 is made available, an appropriate decoding function will likely be included on digital main board 212.

Uncompressed digital input may comprise different formats including the CCIR-656 format (an international standard defining uncompressed baseband video) and the digital video interface format. Most decoding takes place on digital main board 212. Then the processed signal is passed to analog TV chassis 202 to generate audio and video signals for display 216.

Analog baseband A/V input is supported by receiving the analog baseband input via antenna 204, digitizing the analog baseband input to CCIR656 and PCM formats, passing the digitized baseband input to digital main board 212, and encoding the signal into either a MPEG transport stream or DV transport stream prior to any other processing. The processed signal is then sent to analog TV chassis 202 to generate audio and video signals for display 216.

Graphic overlay 214 is a device for adding user interactive graphics on top of the video display. A typical interface may include a menu for adjusting color or brightness on display 216 or a program guide for television channels. Graphic overlay 214 may be mixed or blended with other video signals to form a composite screen.

Figure 3:
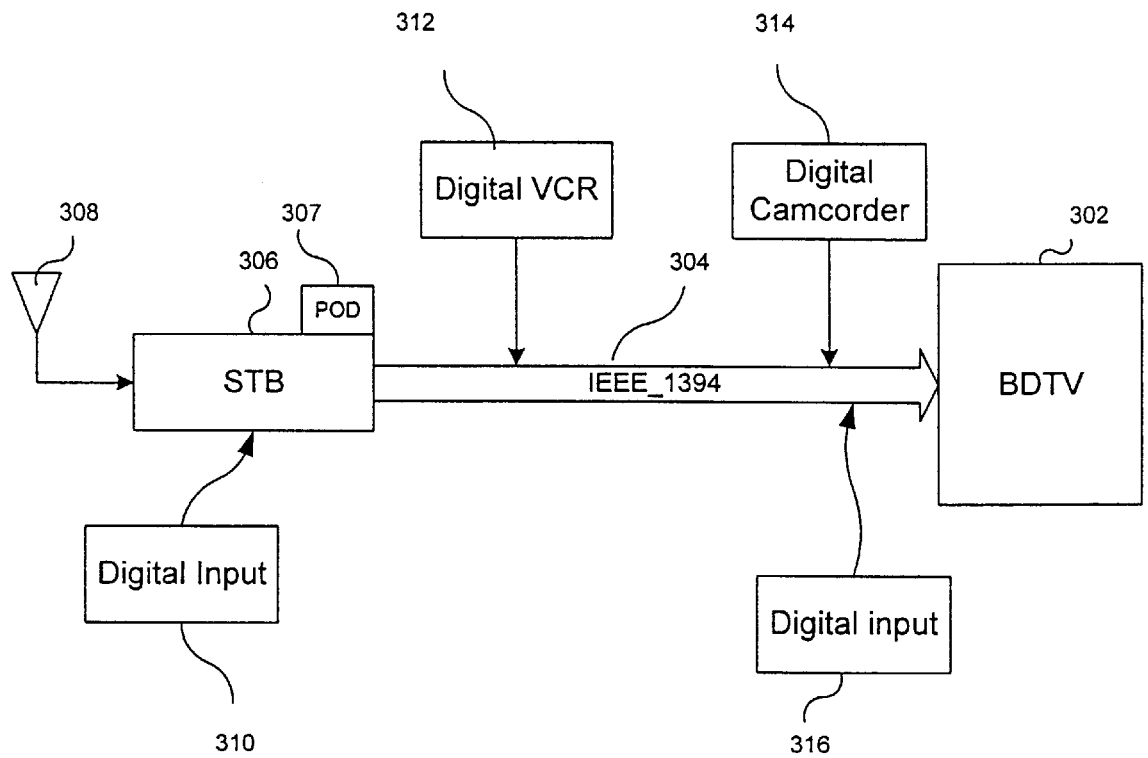
FIG. 3 illustrates a television system capable of receiving analog and digital signals according to and advantageous embodiment of the present invention.

FIG. 3 illustrates system 300 configured for receiving analog and digital A/V signals in accordance with an advantageous embodiment of the present invention. Baseband Digital TV (BDTV) 302 is coupled via IEEE-1394 bus 304 to analog signal originating inputs and to digital signal originating inputs. Set top box (STB) 306 is capable of receiving both analog signals and digital signals via satellite, cable, and terrestrial broadcast through antenna 308. STB 306 may also receive analog and digital signals via cable TV and from non-broadcast digital input 310 including DVD, CD-ROM, Digital Audio Tape, etc. The signal received by STB 306 is transmitted via IEEE-1394 bus 304 to BDTV 302 for processing and display.

Point of deployment (POD) 307 is a removable conditional access module. Whenever a new service becomes available, rather than getting a new STB, a new POD 307 is provided. For example, a user may move from one cable system to another and the only change to be made would be to get a different POD appropriate to the provider and the cable television service. POD 307 is currently being designed into television sets so that the STB can be eliminated and so that television sets are no longer provider specific.

Additionally, digital VCR 312 and digital camcorder 314 may be utilized to send digital signals directly to BDTV 302 via IEEE-1394 bus 304, without any signal processing by STB 306. Digital signals may be directly input to BDTV 302 by digital input device 316 which may be any device that produces digital video signals.

Figure 4:
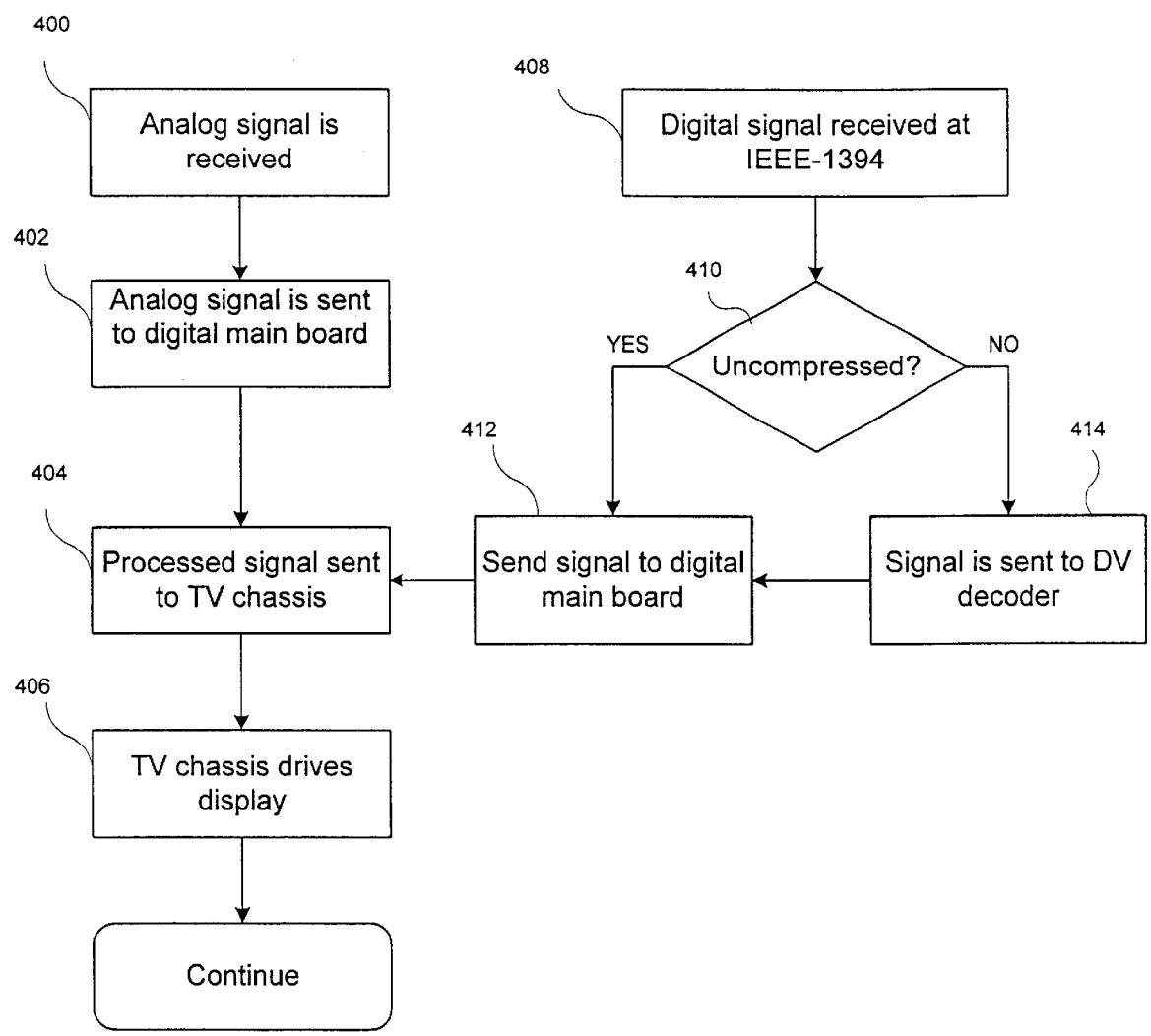
FIG. 4 illustrates a flow chart depicting the operation of an exemplary digital television receiver according to an advantageous embodiment of the present invention.

FIG. 4 illustrates a flow chart of a method for providing a baseband digital television according to an advantageous embodiment of the present invention. The process begins with the step of receiving an analog signal via cable or terrestrial broadcast (step 400). The process continues with the step of sending the analog signal through analog TV chassis 202 to digital main board 212 of baseband digital television 200 (step 402). Then the signal is processed and passed back to analog TV chassis 202 (step 404) and sent to display 216 such as a television CRT or a flat panel display (step 406).

The process also comprises the step of receiving a digital signal 209 in IEEE-1394 digital network interface 208 (step 408). A determination is made whether the signal is compressed or uncompressed (step 410). If the signal is uncompressed, the signal is sent to digital main board 212 for processing (step 412) and then to analog TV chassis 202 (step 404) and then to display 216 (step 406).

If the signal is compressed, the signal is first sent to digital video decoder 210 (step 414) to be decompressed. Signals from a camcorder, VCR or network bitstream are typical signals that would be passed to the digital video decoder 210. The decompressed signal is then sent to digital main board 212 for processing (step 412) and then to analog TV chassis 202 (step 404) and then to display 216 (step 406).

Baseband digital television 200, of the present invention, provides legacy (analog) television signal reception and digital television signal reception. The RF inputs for processing analog audio/video signals are eliminated. The analog baseband A/V input is encoded into a digital transport stream for output to an external device such as a digital VCR (D-VCR) for recording purposes. Features such as instant replay and trick modes may be supported without additional manufacturing cost. A digital network interface 208 (which may be an IEEE-1394 interface in one advantageous embodiment) serves as the input front-end instead of an RF network interface module. Digital network interface 208 can receive digitally transmitted A/V programming information.

Baseband digital television 200 of the present invention provides a digital baseband monitor by restricting the signal interface to digital baseband and processing A/V signals strictly in the digital domain. MPEG and DV decoders, for processing incoming compressed digital signals, provide a digital baseband television receiver. Combining the baseband monitor and baseband television receiver in one system and eliminating the costly RF front-end significantly reduces the cost of a digital television set. By processing only digital signals, the threat of obsolescence is minimized.

Baseband digital television 200 of the present invention supports ATSC and DVB standards since all the current DTV standards and work-in-progress draft standards utilize MPEG transport stream structure and protocol. With few modifications the baseband digital television 200 can be used with virtually any current television standard. This makes baseband digital television 200 capable of operating as a universal multi-standard digital television in both Europe and the United States.

Although the present invention has been described in detail, those skilled in the art should understand that they can make various changes, substitutions and alterations herein without departing from the spirit and scope of the invention in its broadest form.

What is claimed is:

1. For use in a digital television receiver of the type having an analog television chassis and a digital main board for digitizing and decoding audio and video signals, a system for receiving digital audio and video signals, comprising:

a digital network interface coupled to said digital main board, said digital network interface capable of receiving baseband digital audio and video signals from a source of digital signals;

wherein said digital network interface sends said baseband digital audio and video signals to said digital main board and said digital main board sends said baseband digital audio and video signals to said analog television chassis;

wherein said analog television chassis receives first analog audio and video signals and sends said first analog audio and video signals to said digital main board to be digitized;

wherein said digital main board sends to said analog television chassis a digital signal that results from digitizing said first analog audio and video signals; and wherein said analog television chassis receives second analog audio and video signals and provides said second analog audio and video signals to a display without sending said second analog audio and video signals to said digital main board.

2. The system as claimed in claim 1 wherein said digital network interface comprises an input capable of receiving audio and video digital signals from a digital signal playback device.

3. The system as claimed in claim 1 further comprising a graphics overlay signal generator coupled to said digital main board, said graphics overlay signal generator capable of adding at least one digital video signal to digital video signals within said digital main board.

4. The system as claimed in claim 1 further comprising a digital video decoder coupled to said digital network interface and to said digital main board, said digital video decoder capable of decoding said baseband digital audio and video signals from said digital network interface and sending said decoded signals to said digital main board.

5. The system as claimed in claim 1 wherein said second audio and video analog signals have a 2fH format.

6. The system as claimed in claim 1 wherein said digital network interface comprises an IEEE-1394 bus.

7. A digital television receiver comprising:

an analog television chassis;

a digital main board for digitizing and decoding audio and video signals;

a digital network interface coupled to said digital main board, said digital network interface capable of receiving baseband digital audio and video signals from a source of digital signals;

wherein said digital network interface sends said baseband digital audio and video signals to said digital main board and said digital main board sends said baseband digital audio and video signals to said analog television chassis;

wherein said analog television chassis receives first analog audio and video signals and sends said first analog audio and video signals to said digital main board to be digitized;

wherein said digital main board sends to said analog television chassis a digital signal that results from digitizing said first analog audio and video signals; and wherein said analog television chassis receives second analog audio and video signals and provides said second analog audio and video signals to a display without sending said second analog audio and video signals to said digital main board.

8. The digital television receiver as claimed in claim 7 wherein said digital network interface comprises an input capable of receiving audio and video digital signals from a digital signal playback device.

9. The digital television receiver as claimed in claim 7 further comprising a graphics overlay signal generator coupled to said digital main board, said graphics overlay signal generator capable of adding at least one digital video signal to digital video signals within said digital main board.

10. The digital television receiver as claimed in claim 7 further comprising a digital video decoder coupled to said digital network interface and to said digital main board, said digital video decoder capable of decoding said baseband digital audio and video signals from said digital network interface and sending said decoded signals to said digital main board.

11. The digital television receiver as claimed in claim 7 wherein said second audio and video analog signals have a 2fH format.

12. The digital television receiver as claimed in claim 7 wherein said digital network interface comprises an IEEE-1394 bus.

13. For use in a digital television receiver of the type having an analog television chassis and a digital main board for digitizing and decoding audio and video signals, a method of receiving digital video and audio signals in said digital television receiver, the method comprising the steps of:

receiving baseband digital audio and video signals in a digital network interface coupled to said digital main board;

sending said baseband digital audio and video signals from said digital network interface to said digital main board;

sending said baseband digital audio and video signals from said digital main board to said analog television chassis;

receiving first analog audio and video signals in said analog television chassis;

sending said first analog audio and video signals to said digital main board;

digitizing said first analog audio and video signals in said digital main board;

sending a digital signal that results from digitizing said first analog audio and video signals from said digital main board to said analog television chassis; and receiving second analog audio and video signals and providing said second analog audio and video signals to a display without sending said second analog audio and video signals to said digital main board.

14. The method as claimed in claim 13 further comprising the steps of:

decoding baseband digital audio and video signals from said digital network interface in a digital video decoder; and sending decoded baseband digital audio and video signals from said digital video decoder to said digital main board.

15. The method as claimed in claim 14 further comprising the step of:

receiving audio and video digital signals in said digital network interface from a digital signal playback device.

16. The method as claimed in claim 14 further comprising the step of:

adding at least one digital video signal from a graphics overlay signal generator to digital video signals within said digital main board.

17. The method as claimed in claim 13 wherein the second audio and video analog signals have a 2fH format.

18. The method as claimed in claim 13 wherein the step of receiving baseband digital audio and video signals in a digital network interface coupled to said digital main board comprises the step of:

receiving baseband digital audio and video signals in an IEEE-1394 bus.

19. The method as claimed in claim 14 wherein the step of decoding baseband digital audio and video signals from said digital network interface in a digital video decoder comprises the step of:

decoding baseband digital audio and video signals from an IEEE-1394 bus.

\* \* \* \* \*